United States Patent [19]

Paulsel et al.

[11] Patent Number: 5,075,721

[45] Date of Patent: Dec. 24, 1991

[54] METHOD AND APPARATUS FOR CONTROLLING THE MOVEMENT OF PAPER-HOLDING TRAYS WITHIN A PRINTER OR THE LIKE

[75] Inventors: Roger Q. Paulsel, Houston; Mark H. Ruch, Spring, both of Tex.

[73] Assignee: COMPAQ Computer Corporation, Houston, Tex.

[21] Appl. No.: 564,745

[22] Filed: Aug. 8, 1990

[51] Int. Cl.$^5$ .................................. G03B 27/52

[52] U.S. Cl. .................................. 355/72; 271/9

[58] Field of Search .................. 355/309, 311, 72; 271/9, 3.1, 157-159, 162, 145, 147; 414/121, 280, 411, 416

[56] References Cited

U.S. PATENT DOCUMENTS 4,660,820 4/1987 Shino et al. .................. 271/9

4,878,799 11/1989 Seto .................. 271/9 X

*Primary Examiner*—L. T. Hix

*Assistant Examiner*—D. Rutledge

*Attorney, Agent, or Firm*—J. David Cabello; James R. Burdett

[57] ABSTRACT

Paper handling mechanisms for printers, copiers and the like typically have a separate paper feeding mechanism associated with each paper tray. The separate paper feeding mechanisms can only remove paper from the associated tray. Therefore, the paper handling mechanisms are redundant, space consuming, and inefficient to use. Disclosed herein is a paper handling mechanism that uses a single paper-feeding mechanism to remove paper from a plurality of trays. Since a separate paper-feeding mechanism is not required for each tray, more trays may be disposed in the same vertical space of prior printers or copiers. Advantageously, the single paper-feeding mechanism moves generally vertically, and the trays selectively move generally horizontally to intersect the paper-feeding mechanism. Preferably, a plurality of gears are disposed adjacent each horizontally moveable tray. The plurality of gears are adapted to engage a corresponding gear member on each of the respective trays. To move a selected tray horizontally to intersect the paper-feeding mechanism, one of the plurality of gears moves into engagement with the corresponding gear member on the selected tray, and imparts horizontal motion to the selected tray so that the paper-feeding mechanism can remove paper from the selected tray.

20 Claims, 5 Drawing Sheets

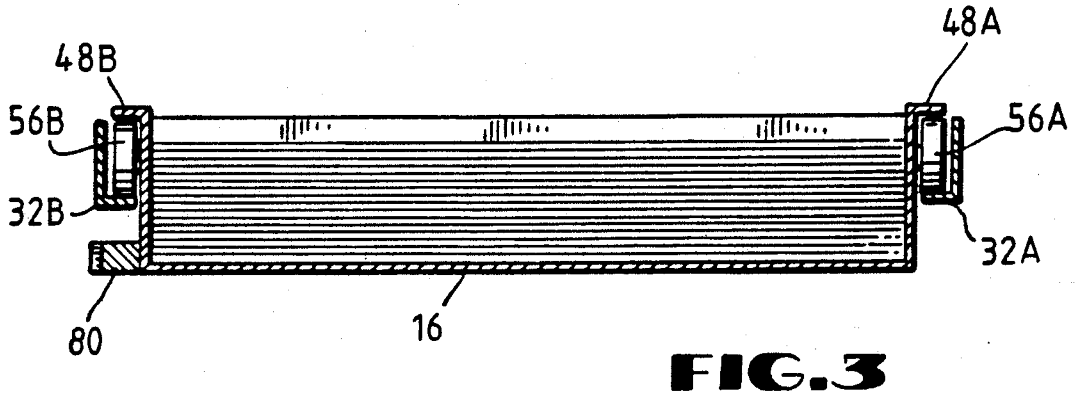
FIG.3
FIG.4
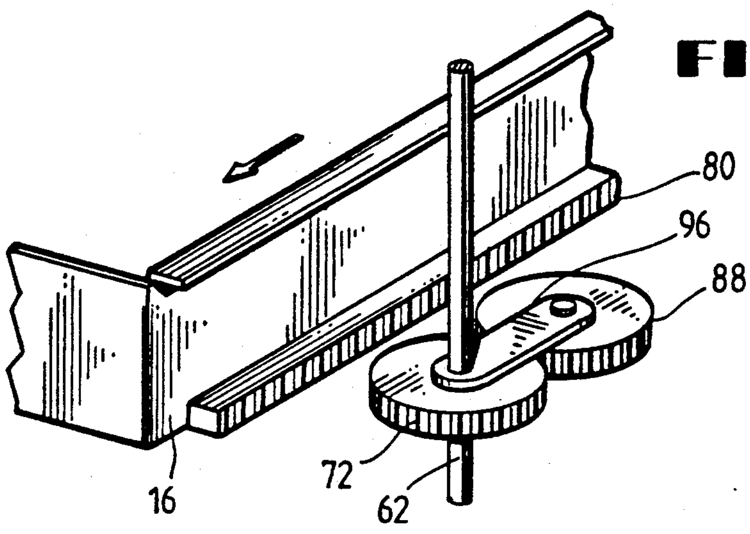
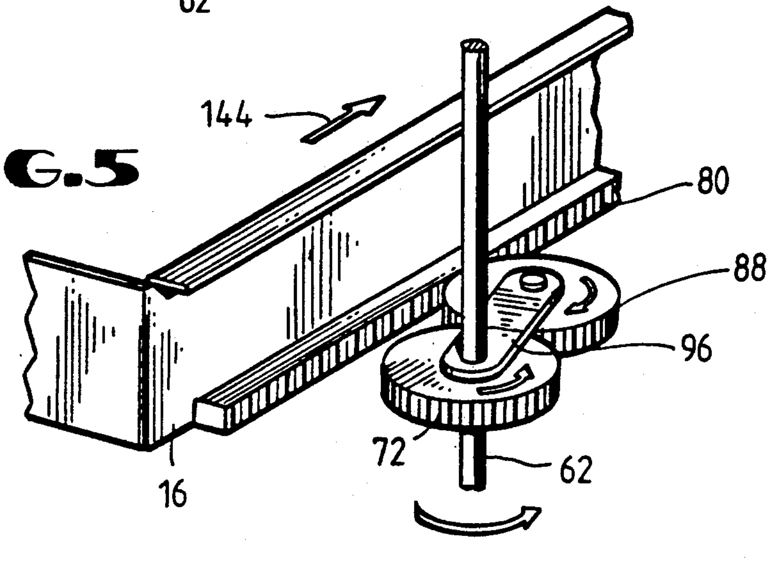
FIG.5

METHOD AND APPARATUS FOR CONTROLLING THE MOVEMENT OF PAPER-HOLDING TRAYS WITHIN A PRINTER OR THE LIKE

BACKGROUND OF THE INVENTION

1. FIELD OF THE INVENTION

This invention relates generally to printers, and, more particularly, to a method and apparatus for controlling the movement of selected paper-holding trays which feed a printer, a copier, or the like.

2. DESCRIPTION OF THE RELATED ART

Printers, such as electrophotographic and laser printers, are typically used in an office environment where they are connected to personal computers, personal computer networks, or dedicated word processing computers. Most office printers, commonly referred to as desktop printers, share common advantageous characteristics. These characteristics include: small size, high print quality, quiet operation, and adequate speed for word processing applications.

These printers include paper handling mechanisms that usually employ separate trays for holding different types or different sizes of paper. These trays are typically configured to hold approximately 250 sheets of paper. If the paper handling mechanism includes only one tray, then the printer is capable of withdrawing paper from only the one tray during a requested printing operation. When the printer receives instructions to print on different types of paper during a printing operation, the single tray must be removed and replaced with another tray containing the proper paper.

To obviate this problem, printers have been adapted to include multiple trays from which different types or different sizes of paper may be withdrawn. When a multiple-tray printer receives instructions to print on different types of paper during a printing operation, the paper handling mechanism associated with the printer simply withdraws paper from the appropriate tray.

A paper-feeding mechanism is used to withdraw paper from a tray, and typically includes at least one rubber-like roller that rotatably engages the paper within the tray and draws the paper into the printing mechanism. When a printer includes a paper handling mechanism that includes more than one tray, each tray ordinarily has a dedicated paper-feeding mechanism associated with it. Further, the trays and their associated paper-feeding mechanisms are normally stacked in a vertical arrangement, and, therefore, consume vertical space equal to the vertical height of each 250 sheet tray and the vertical height of each paper-feeding mechanism. Accordingly, the combined vertical height of each tray and paper-feeding mechanism limits the maximum number of trays that can be associated with a paper handling mechanism of a desktop printer.

Commonly used paper trays include a spring that forces the paper within the tray into contact with the rubber-like roller of its associated paper-feeding mechanism. Since the paper-feeding mechanism is stationary, the spring force constantly maintains the top sheet of paper in contact with the paper-feeding mechanism so that the mechanism operates properly as the paper stack is depleted. However, when additional paper is loaded into a particular tray, the printing process from that tray must cease while the tray is removed and the paper supply replenished. This is particularly time consuming where the user wishes to print a short run of unique paper that differs from the paper currently loaded in any of the trays.

To obviate this problem, previous printers have employed a sheet feeding mechanism that allows an operator to print a small number of copies on a paper style unique from that currently loaded in any of the trays. The operator singularly and consecutively feeds the required number of sheets of the unique paper style into the sheet feeding mechanism. However, this is also a time consuming process that does not free the user to accomplish other tasks, but requires that the user remain at the printer, consecutively feeding each sheet of paper into the printer, until the entire printing process is complete.

Alternatively, the user may remove the tray from the paper handling mechanism, insert the desired number of sheets of paper into the tray, and replace the tray in the paper handling cassette. While this method does free the user to leave the printer during the printing process, the procedure of removing the tray and loading the tray with a precise number of unique sheets of paper causes the printer to discontinue printing until the tray has been replaced.

Since the market for desktop printers is highly competitive extremely cost sensitive, any proposed solution to these problems, or other advances in printer technology, should be economical, durable, and easy to manufacture and repair.

The present invention is directed to overcoming, or at least minimizing, one or more of the problems as set forth above.

SUMMARY OF THE INVENTION

The present invention provides a paper handling mechanism that uses a single paper-feeding mechanism to remove paper from a plurality of trays. Since a separate paper-feeding mechanism is not required for each tray, more trays may be disposed in the same vertical space of prior printers or copiers. Moreover, since the single paper-feeding mechanism contacts paper within a tray only when removing paper from the tray, additional paper may be added to a tray at any other time.

Preferably, the single paper-feeding mechanism moves generally vertically, and the trays selectively move generally horizontally to intersect the paper-feeding mechanism. In one aspect of the present invention, a plurality of gears are disposed adjacent each horizontally moveable tray. The plurality of gears are adapted to engage a corresponding gear member on each of the respective trays. To move a selected tray horizontally to intersect the paper-feeding mechanism, one of the plurality of gears moves into engagement with the corresponding gear member on the selected tray. Then, the one gear imparts horizontal motion to the selected tray, and drives the tray into a paper-feeding position where the paper-feeding mechanism can remove paper from the selected tray.

To simplify the paper handling mechanism in accordance with the present invention, a plurality of levers are disposed adjacent each tray. The levers are pivotally moveable from a blocking position to a non-blocking position. In the blocking position, the levers prevent the gears from engaging their corresponding gear members on the respective trays. In the non-blocking position, the levers allow the gears to engage their corresponding gear members on the respective trays. Preferably, the paper-feeding mechanism moves the levers from the blocking position to the non-blocking position as it moves vertically adjacent the trays. When the paper-feeding mechanism is positioned adjacent the selected tray, the lever associated with that tray is in the non-blocking position. Therefore, the gear may engage the gear member on the selected tray, and move the selected tray into the paper-feeding position.

BRIEF DESCRIPTION OF THE DRAWINGS

Advantages of the invention will become apparent upon reading the following detailed description and upon reference to the drawings in which:

FIG. 3 is a cross-sectional view of a paper tray taken along line 3—3 in FIG. 2;

FIG. 4 is a perspective view of a portion of the paper handling mechanism of FIG. 1 that illustrates a planet gear in an unengaged position;

FIG. 5 is a perspective view of a portion of the paper handling mechanism of FIG. 1 that illustrates a planet gear engaged with its associated rack;

Figure 1:
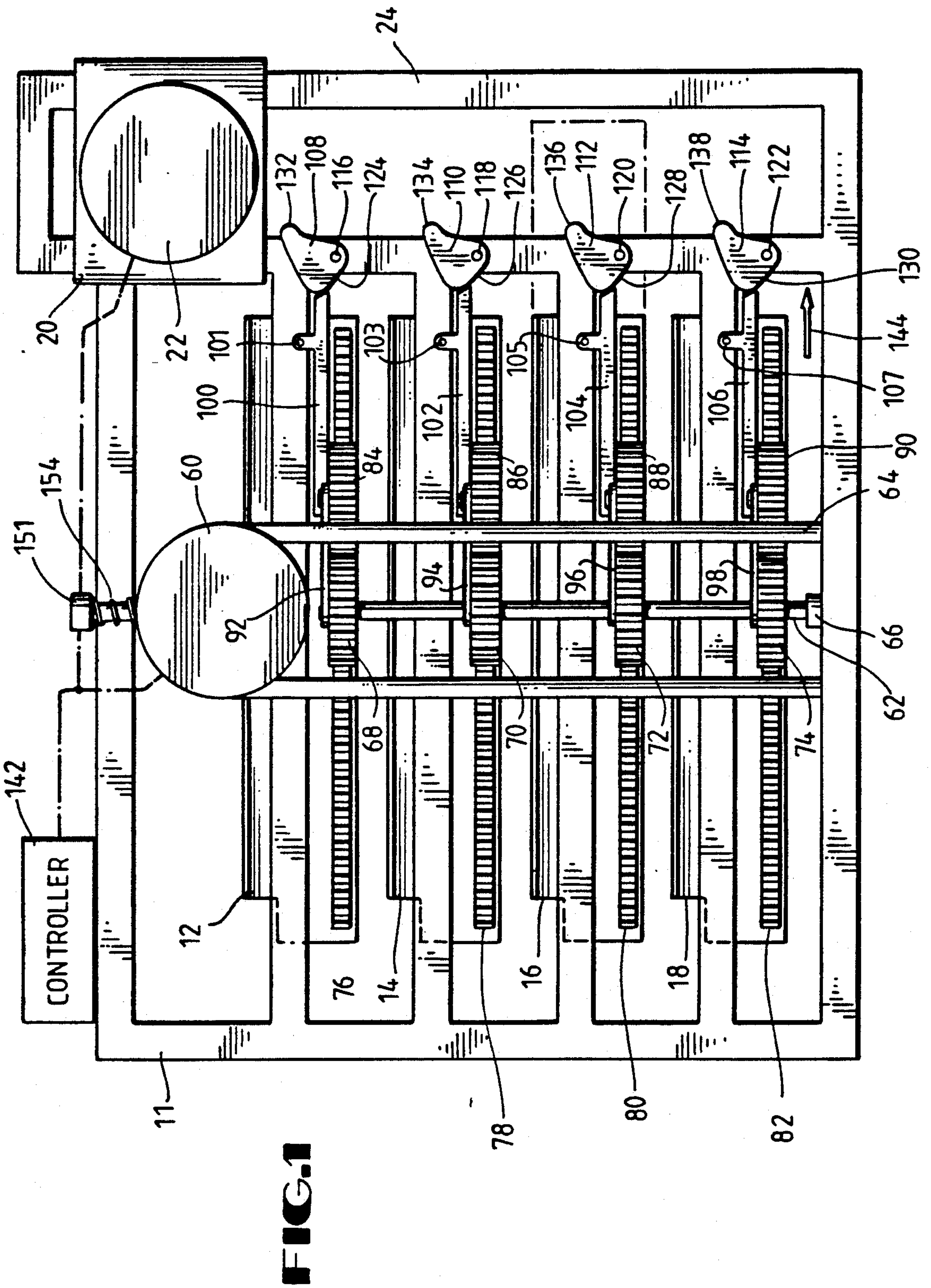
FIG. 1 is a side view of a paper handling mechanism for controlling the movement of a plurality of trays in accordance with the present invention.

While the invention is susceptible to various modifications and alternative forms, specific embodiments have been shown by way of example in the drawings and described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF THE PREFERRED EMBODIMENTS

Turning to the drawings and referring first to FIG. 1, a side view of a paper handling mechanism 10 for a printer or copier (not shown) is illustrated. While the discussion of the mechanism 10 is primarily confined to its combination with an electrophotographic desktop printer, it is readily envisioned that the mechanism 10 may be combined with various types and styles of printers, copiers, facsimile machines, or scanners without departing from the spirit and scope of the present invention.

The mechanism 10 includes a frame 11 that houses a plurality of paper containing trays 12, 14, 16, and 18. The trays 12, 14, 16 and 18 are slidably disposed within the frame 11 as will be explained in detail with respect to FIG. 2. For ease of illustration, the trays 12, 14, 16 and 18 are illustrated as being the same size, but in actuality the trays 12, 14, 16 and 18 would normally be sized to accept different types and sizes of paper. Preferably, each tray 12, 14, 16, and 18 contains a different style of paper, so that when a user selects the desired style of paper, the printer automatically selects the proper tray 12, 14, 16 or 18. For example, it might be desireable to load each of the trays 12, 14, 16 and 18 with letterhead, white bond, A4, and legal, respectively. Since the multiple trays 12, 14, 16 and 18 may be loaded with various types of paper, the user is relieved of the time consuming task of loading the printer with additional paper each time a different style of paper is desired.

To conserve space and to reduce the overall cost of the paper handling mechanism 10, the trays 12, 14, 16 and 18 are arranged vertically in close proximity to one another. A single paper-feeding mechanism 20 draws paper from all of the trays 12, 14, 16 and 18. Therefore, the paper-feeding mechanism 20 generally moves vertically to selectively engage each of the plurality of trays 12, 14, 16 and 18. As illustrated, an electric motor 22 generates power to move the paper-feeding mechanism 20 vertically. Preferably, the electric motor 22 is connected to and travels with the paper-feeding mechanism 20 along a vertical frame assembly 24.

The vertical frame assembly 24 may be constructed from any of a variety of devices, including a rack and pinion, or a rolamite. One preferred embodiment of such a vertical frame assembly 24 and paper-feeding mechanism 20 is discussed in co-pending patent application Ser. No. 07/360,395 filed June 2, 1989 by Mark Ruch et al. In this co-pending patent application, the motor 22 also provides power to a rotating rubber wheel that contacts the stack of paper located in each of the trays. Contact between the rotating wheel and the top sheet in any of the stacks of paper urges the top sheet from the stack and into the printer where the actual printing process is performed.

Another preferred embodiment of such a vertical frame assembly 24 and paper-feeding mechanism 20 is discussed in co-pending patent application Ser. No. 360,395 filed June 2, 1989 by Mark Ruch et al., now U.S. Pat. No. 5,005,817. In this co-pending patent application, the motor 22 also provides power to a shaft having a gear thereon. After a portion of the paper-feeding mechanism has separated the top sheet in a selected stack from the other sheets, the gear engages with a complimentary gear on a second shaft. The second shaft carries a pair of rubber wheels. As the rubber wheels rotate, the wheels remove the top sheet from the stack and move the top sheet into a printer where the actual printing process is performed.

Since the paper-feeding mechanism 20 moves vertically at one end of the trays 12, 14, 16 and 18, the trays 12, 14, 16 and 18 are preferably horizontally moveable between a rest position and a paper-feeding position. When the trays 12, 14, 16 and 18 are in the rest position, as illustrated, the paper-feeding mechanism 20 does not contact the paper within the trays as it moves vertically. However, when a selected tray 12, 14, 16 or 18 is moved into the paper-feeding position, as illustrated by the phantom lines corresponding to tray 16 in FIG. 1, the selected tray intersects the vertical path of the paper-feeding mechanism 20. When a tray 12, 14, 16 or 18 is in the paper-feeding position, the paper-feeding mechanism 20 can contact the stack of paper within the selected tray 12, 14, 16 or 18, and remove paper from the stack.

It should be appreciated that when the trays 12, 14, 16 and 18 are in the rest position, all of the trays 12, 14, 16 and 18 are readily available for receiving paper. The added paper can either be additional paper of the same type, or small quantities of special paper specifically loaded for a special print request (i.e., transparencies for overheads, special size paper, special color paper, etc.). Loading the trays 12, 14, 16 and 18 is particularly simple because, unlike the prior devices, the paper-feeding mechanism 20 is not in contact with the stack of paper. Thus, owing to a lack of mechanical obstructions, the paper is directly loadable into the trays 12, 14, 16 and 18 from the rear of the mechanism 10.

Figure 2:
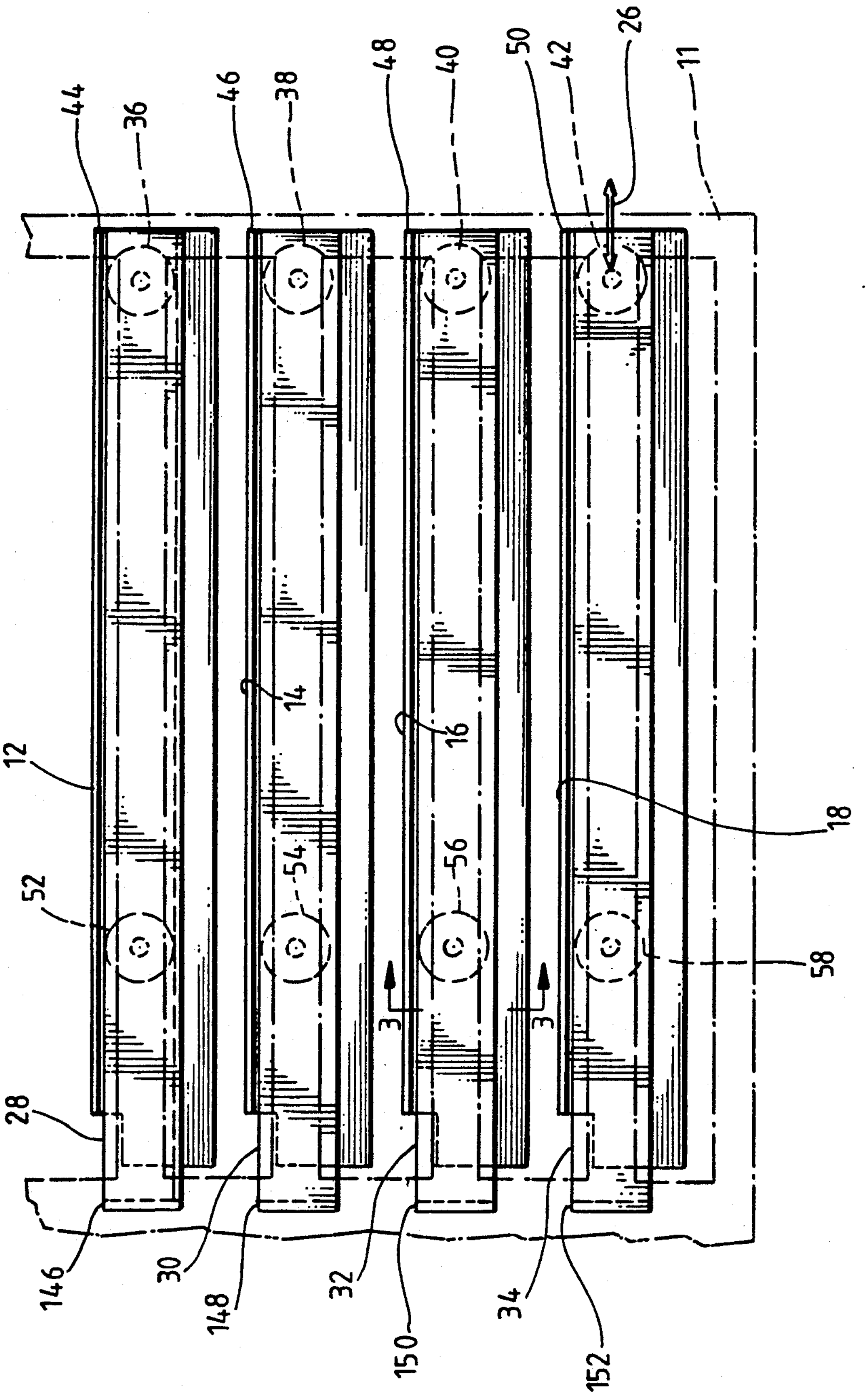
FIG. 2 is a side view of paper trays for use with the present invention.

FIG. 2 illustrates a preferred embodiment of the slidable trays 12, 14, 16 and 18. This view is taken from the side of the mechanism 10 opposite that illustrated in FIG. 1. The frame 11 is illustrated by the phantom lines that correspond to the reference numeral 11. The trays 12, 14, 16 and 18 are adapted to slide in the horizontal direction as designated by a double-headed arrow 26. Each of the trays 12, 14, 16 and 18 is slidably mounted on respective rails 28, 30, 32 and 34. A roller 36, 38, 40 and 42 is rotatably mounted one end of each of the respective rails 28, 30, 32 and 34 so that each roller 36, 38, 40 and 42 engages a corresponding upper, outwardly extending lip 44, 46, 48 and 50 provided on each of the respective trays 12, 14, 16 and 18. To support the end of each tray 12, 14, 16 and 18 that is opposite the rollers 36, 38, 40 and 42, rollers 52, 54, 56 and 58 are rotatably mounted at one end of each respective tray 12, 14, 16 and 18. The rollers 52, 54, 56 and 58 ride on a lower flange portion of the rails 28, 30, 32 and 34, respectively.

Preferably, each tray 12, 14, 16 and 18 is supported on two sides. A illustrated by the cross-sectional view of tray 16 in FIG. 3, each tray 12, 14, 16 and 18 includes two opposing lips 48A, 48B and two opposing rollers 56A, 56B, so that each tray 12, 14, 16 and 18 is supported by two rails 32A, 32B. The rails 28, 30, 32 and 34 on each side of the trays 12, 14, 16 and 18 are preferably mounted, e.g., by brackets (not shown), directly to the frame 11.

Referring again to FIG. 1, an electric motor 60 provides the mechanical power to selectively drive the trays 12, 14, 16 and 18 along the rails 28, 30, 32 and 34 between the rest and paper-feeding positions. The motor 60 is operably connected to a shaft 62 that extends vertically along one side of the trays 12, 14, 16 and 18. The motor 60 and the shaft 62 are mounted on a frame 64 that extends vertically along one side of the trays 12, 14, 16 and 18. The lower portion of the shaft 62 resides within a coupling 66 that is mounted on the lower portion of the frame 64. The coupling 66 permits the shaft 62 to rotate about its axis in response to rotation of the motor 60.

A plurality of sun gears 68, 70, 72 and 74 are fixed to the shaft 62 at various vertical locations that coincide with racks 76, 78, 80 and 82, respectively. The racks 76, 78, 80 and 82 extend horizontally along one side of each of the trays 12, 14, 16 and 18, respectively. Each sun gear 68, 70, 72 and 74 meshes with a respective planet gear 84, 86, 88 and 90, and respective carrier links 92, 94, 96 and 98 hold the sun gears 68, 70, 72 and 74 in engagement with each respective planet gear 84, 86, 88 and 90.

The sun gears 68, 70, 72 and 74 do not engage the respective racks 76, 78, 80 and 84. Rather, in response to rotation of the shaft 62, each of the planet gears 84, 86, 88 and 90 attempts to pivot into engagement with its respective rack 76, 78, 80 and 82. As an example, FIG. 4 depicts the gear assembly associated with the tray 16. The planet gear 88 is spaced apart from the rack 80 when the motor 60 is not rotating the shaft 62. As illustrated in FIG. 5, when the motor 60 begins to rotate the shaft 62 and the sun gear 72, the carrier link 96 causes the planet gear 88 to pivot into engagement with the rack 80.

However, a plurality of levers 100, 102, 104 and 106, which are pivotally attached to the frame 11 via respective pivot pins or bolts 101, 103, 105 and 107, are adapted to block the planet gears 84, 86, 88 and 90, respectively, from pivoting into engagement with their respective racks 76, 78, 80 and 82. In their blocking position, the levers 100, 102, 104 and 106 contact the respective carrier links 92, 94, 96 and 98, and, thus, maintain each of the respective planet gears 84, 86, 88 and 90 spaced apart from the respective racks 76, 78, 80 and 82. In the non-blocking position, the levers 110, 102, 104 and 106 allow the planet gears 84, 86, 88 and 90 to engage the corresponding racks 76, 78, 80 and 82.

Figure 6:
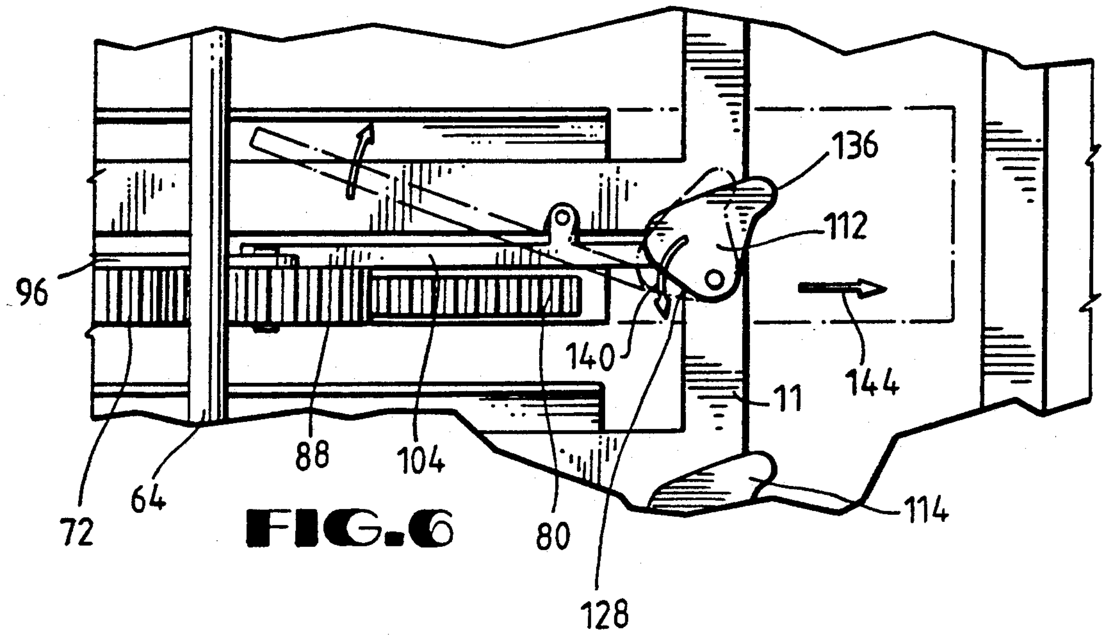
FIG. 6 is a side view of a portion of the paper handling mechanism of FIG. 1 that illustrates the movement of a cam and its associated blocking lever in accordance with the present invention.

Each of the levers 100, 102, 104 and 106 includes an associated Cam 108, 110, 112 and 114. Each cam 108, 110, 112 and 114 is pivotally connected to the frame 11 via a pivot pin or bolt 116, 118, 120 and 122, respectively. One edge surface 124, 126, 128 and 130 of each respective cam 108, 110, 112 and 114 contacts one end of each of the respective levers 100, 102, 104 and 106. Another edge surface 132, 134, 136 and 138 of each respective cam 108, 110, 112 and 114 is adapted to contact the paper-feeding mechanism 20 as it moves upwardly or downwardly within the vertical frame 24. For example, as illustrated in FIG. 6 with respect to the mechanism associated with tray 16, contact with the edge surface 136 causes the cam 112 to rotate in the direction of arrow 140. As the cam 112 rotates, the edge surface 128 pushes downwardly on one end of the lever 104, and the other end of the lever 104 pivots upwardly and out of engagement with the respective carrier link 96.

To initiate a preferred paper-feeding sequence, an electronic controller 142 signals the motor 22 to begin moving the paper-feeding mechanism 20 downwardly from its rest position near the top of the vertical frame 24. As the paper-feeding mechanism 20 moves downwardly, it contacts the sequentially dispersed cams 108, 110, 112 and 114. The contact causes the contacted lever 100, 102, 104 or 106 to pivot upwardly into a non-blocking position, as illustrated by the dashed lines associated with the lever 104 in FIG. 6. As previously discussed, with a lever 100, 102, 104 or 106 in its non-blocking position, the respective planet gear 84, 86, 88 or 90 is free to rotate into engagement with its respective rack 76, 78, 80 or 82.

However, the controller 142 does not signal the motor 60 to begin rotating the shaft 62 until the appropriate lever 100, 102, 104 or 106 has been pivoted from its rest position into its non-blocking position. Until the motor 60 rotates the shaft 62, the corresponding planet gears 84, 86, 88 and 90 do not rotate into engagement with the respective racks 76, 78, 80 and 82 even if one of the levers 100, 102, 104 or 106 is in its non-blocking position. Therefore, the paper-feeding apparatus 20 may move downwardly and contact one or more of the cams 108, 110, 112 and 114 without the corresponding trays 12, 14, 16 and 18 beginning to move horizontally in the direction of arrow 144.

Once the motor 22 has moved the paper-feeding mechanism 20 to its preselected position adjacent the selected tray 12, 14, 16 or 18 so that the corresponding lever 100, 102, 104 or 106 is in its non-blocking position, the controller 142 de-energizes the motor 22. The controller 142 then energizes the motor 60, which is preferably a stepper motor. As the shaft 62 rotates, the selected planet gear 84, 86, 88 or 90 pivots into engagement with its respective rack 76, 78, 80 or 82. As the shaft 62 continues to rotate after engagement, the sun gear 68, 70, 72 or 74 counter-rotates the respective planet gear 84, 86, 88 or 90. Thus, the selected tray 12, 14, 16 or 18 moves horizontally in the direction of arrow 144 from its rest position into its paper-feeding position.

A respective stop 146, 148, 150 and 152 halts the horizontal movement of each respective tray 12, 14, 16 and 18 when the tray reaches the paper-feeding position. As illustrated in FIG. 2, a flange on the end of each rail 28, 30, 32 and 34 forms each stop 146, 148, 150 and 152. As each tray 12, 14, 16 and 18 moves in the direction of arrow 144, its respective roller 52, 54, 56 and 58 abuts against the respective stop 146, 148, 150 and 152. Therefore, the rollers 52, 54, 56 and 58 are placed a predetermined distance from the respective stops 146, 148, 150 and 152 in order to halt movement of the trays 12, 14, 16 and 18 when they reach the paper-feeding position. Alternatively, flanges may be formed in the frame 11 to stop movement of the trays 12, 14, 16 and 18 when they reach the paper-feeding position, or a stop could be connected to the paper-feeding mechanism 20.

Figure 7:
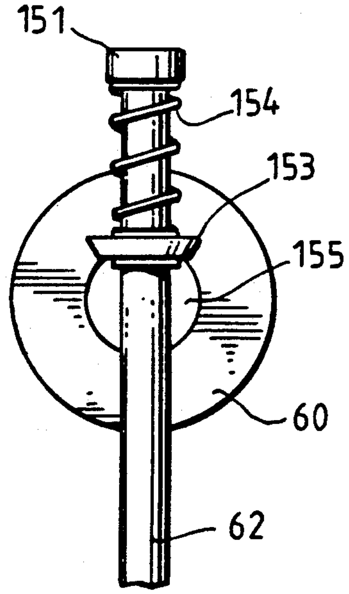
FIG. 7 is a side view of a motor and gear arrangement for a paper-handling mechanism in accordance with the present invention.

The controller 142 continues to energize the motor 60 until it has turned through a preselected number of steps. However, it is not necessary that the preselected number of steps precisely correspond to the longitudinal movement required for the trays 12, 14, 16 and 18 to contact the respective stops 146, 148, 150 and 152. Instead, as illustrated in FIG. 7, a spring 154 is preferably disposed about the shaft 62 and connected between a cap 151 and a gear 153. The motor 60 turns the gear 153 using a gear 155 which is connected to the output shaft (not shown) of the motor 60. As motor 60 turns the gear 153, this rotational movement is transferred to the shaft 62 through the spring 154. Since the spring 154 transfers force from the motor 60 to the shaft 62, the motor 60 may continue to rotate even after the selected tray 12, 14, 16 or 18 has abutted its respective stop 146, 148, 150 or 152. Preferably, the motor 60 overdrives the selected tray 12, 14, 16 or 18 to ensure that the selected tray is in the proper paper-feeding position. When the motor is overdriven, the spring 154 compresses and absorbs the excess energy from the motor 60. Therefore, the controller 142 need not know the precise number of steps required to move a tray 12, 14, 16 or 18 from its rest position to its paper-feeding position, since the motor 60 may turn through additional steps without damaging the mechanism 10.

Once the motor 60 moves the selected tray 12, 14, 16 or 18 to the paper-feeding position, the controller 142 maintains torque on the motor 60 to keep the selected tray 12, 14, 16 or 18 in its paper-feeding position. The controller 142 also re-energizes the motor 20 so that the paper-feeding mechanism 22 moves downwardly into contact with the paper in the selected tray 12, 14, 16 or 18. Once in contact with the paper in the selected tray 12, 14, 16 or 18, the paper-feeding mechanism 22 may remove the desired number of sheets of paper. After the paper-feeding mechanism 20 has removed the desired number of sheets of paper from a tray 12, 14, 16 or 18, the paper-feeding mechanism 22 returns to its rest position at the top of the vertical frame 24.

Figure 8:
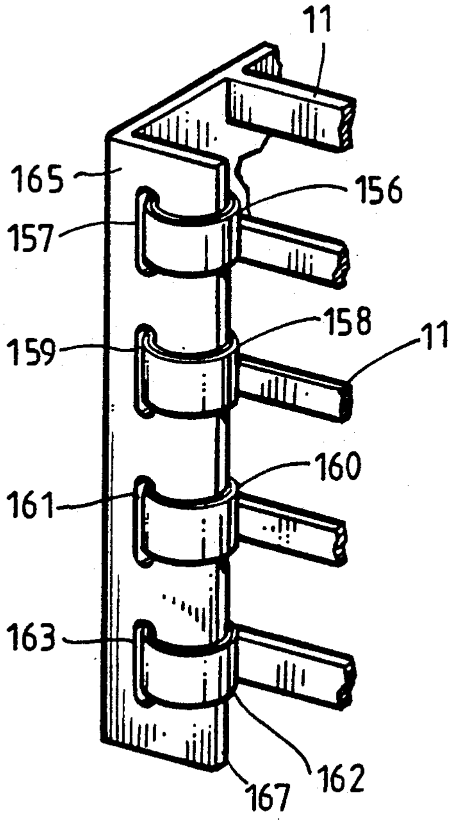
FIG. 8 is a perspective view of a portion of the frame to which tray return springs connect.
Figure 10:
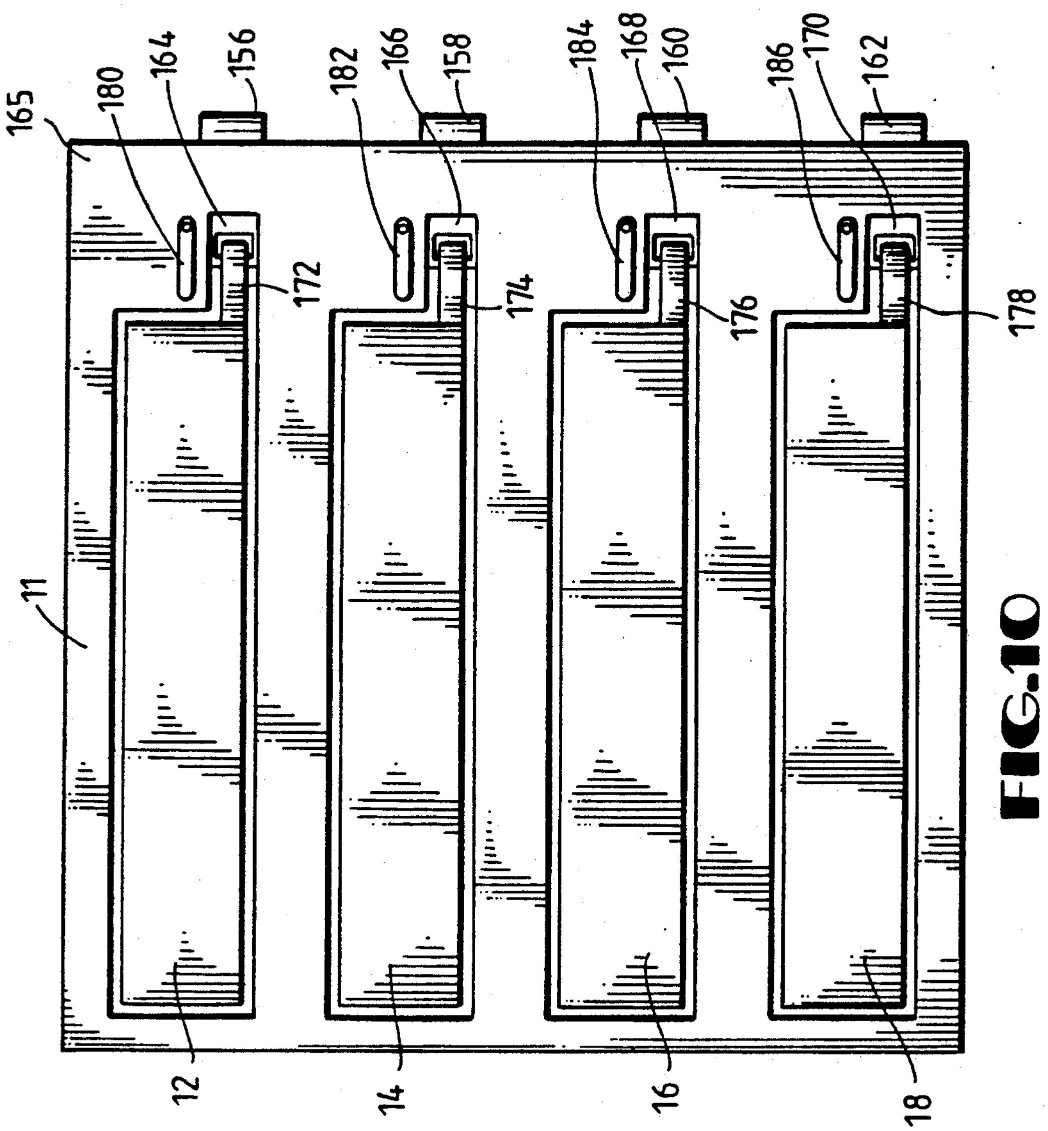
FIG. 10 is a rear view of the paper handling mechanism in accordance with the present invention.
Figure 9:
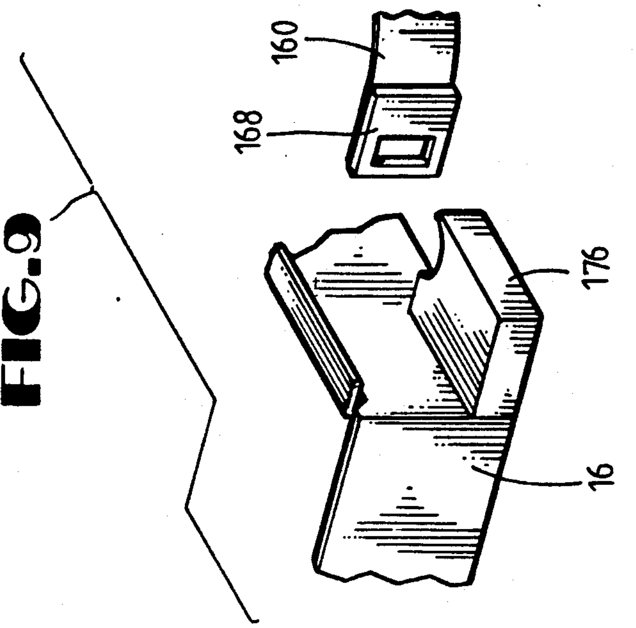
FIG. 9 is a perspective view of a spring arrangement in accordance with the present invention.

Referring now to FIGS. 8–10, the controller 142 also de-energizes the motor 60 so that springs 156, 158, 160 or 162 return the selected tray 12, 14, 16 or 18 to its rest position. Preferably, the springs 156, 188, 160 and 162 offer constant force over distance to provide a smooth transition. Springs of this type are illustrated in FIG. 8 as coiled leaf springs 156, 158, 160 and 162. Adjacent each of the respective trays 12, 14, 16 and 18, one end of each coiled leaf spring 156, 158, 160 and 162 is fixedly connected to a portion 165 of the frame 11. Each spring 156, 158, 160 and 162 is disposed through a slot 157, 159, 161 and 163, respectively, and coiled between the slot 157, 159, 161 and 163 and an edge 167 of the portion 165 of the frame 11.

A stirrup member 164, 166, 168 and 170 is connected to the other end of each respective coiled leaf spring 156, 158, 160 and 162. A foot member 172, 174, 176 and 178 is connected to one end of each of the respective trays 12, 14, 16 and 18 adjacent each respective stirrup member 164, 166, 168 and 170. When the trays 12, 14, 16 and 18 are inserted into the frame 11, the foot members 172, 174, 176 and 178 slide into their respective stirrup members 164, 166, 168 and 170. For example, FIG. 9 illustrates the foot member 176 prior to engaging the stirrup member 168.

Since the trays 12, 14, 16 and 18 are biased by the springs 156, 158, 160 and 162, latches 180, 182, 184 and 186 are provided to maintain the trays 12, 14, 16 and 18 Within the frame 11. As illustrated in FIG. 10, the latches 180, 182, 184 and 186 are pivotally attached to the rear portion of the frame 11. Once the trays 12, 14, 16 and 18 are inserted into the frame 11, the latches 180, 182, 184 and 186 are pivoted into contact with the rear portion of each of the feet 172, 174, 176 and 178. Therefore, as a selected tray 12, 14, 16 or 18 is driven to its paper-feeding position, the respective coil spring 156, 158, 160 or 162 extends to allow such motion; and as the spring 156, 158, 160 or 162 returns the selected tray 12, 14, 16 or 18 to its rest position, the respective latch 180, 182, 184 or 186 halts the rearward movement of the tray 12, 14, 16 or 18 in the rest position.

We claim:

1. A paper handling mechanism, comprising:

a plurality of paper receiving trays, each of said trays being adapted for receiving a stack of sheets of paper, said plurality of trays being generally vertically arranged relative to one another and being adapted for generally horizontal movement between a first position and a second position;

a like plurality of rack gears, each rack gear being generally horizontally connected to a side of one of said respective trays;

a like plurality of pinion gears being generally vertically arranged relative to one another, each of said pinion gears being disposed adjacent one of said respective rack gears; and means for selectively engaging a selected pinion gear with its respective rack gear, and moving a selected one of said trays between said first and second positions.

2. The mechanism as set forth in claim 1, wherein said engaging means comprises:

a motor;

a shaft having a longitudinal axis and being generally vertically disposed adjacent said trays, said motor being operably connected to said shaft and being adapted to rotate said shaft about its longitudinal axis;

a like plurality of sun gears being connected to said shaft and being generally vertically arranged relative to one another along said shaft, each of said sun gears being disposed adjacent one of said respective rack gears; and a like plurality of links rotatably connecting each of said sun gears to one of said respective pinion gears.

3. The mechanism as set forth in claim 2, wherein said engaging means comprises:

a like plurality of levers being generally vertically arranged relative to one another, each of said levers being disposed adjacent one of said respective pinion gears and being pivotally moveable between a blocking position and a non-blocking position, wherein, in the blocking position, each of said levers prevent engagement between said respective rack and pinion gears, and in the non-blocking position, each of said levers permit engagement between said respective rack and pinion gears.

4. The mechanism as set forth in claim 3, wherein said engaging means comprises:

means for moving a selected one of said levers from the blocking position to the non-blocking position.

5. The mechanism as set forth in claim 4, wherein said moving means comprises:

a like plurality of cam members being pivotally moveable and being generally vertically arranged relative to one another, each of said cam members being disposed in contact with one of said respective levers, wherein pivotal movement of said cam members pivotally moves the respective levers between the blocking position and the non-blocking position.

6. The mechanism as set forth in claim 5, wherein said moving means comprises:

paper feeding means for contacting the stack of paper of one of said trays when said one tray is in the second position and removing one of said sheets of paper from the contacted stack, said paper feeding means being controllably moveable along a preselected generally vertical path adjacent said trays.

7. The mechanism as set forth in claim 6, wherein said paper feeding means is adapted to contact at least a selected one of said cam members as said paper feeding means moves vertically, the contact with said one selected cam member causing one of said respective levers to pivot from the blocking to the non-blocking position.

8. A paper handling mechanism, comprising:

a frame;

a plurality of paper receiving trays, each of said trays being adapted for receiving a stack of sheets of paper, said plurality of trays being generally vertically arranged relative to one another with in said frame and being adapted for generally horizontal movement between a rest position and a paper-feeding position, each of said plurality of trays having a rack gear horizontally connected thereto;

a motor;

a shaft having a longitudinal axis and being generally vertically disposed on said frame adjacent said trays, said motor being operably connected to said shaft and being adapted to rotate said shaft about its longitudinal axis;

a like plurality of sun gears being connected to and rotatable with said shaft and being generally vertically arranged relative to one another along said shaft, each of said sun gears being disposed adjacent one of said corresponding rack gears;

a like plurality of pinion gears;

a like plurality of links counter-rotatably connecting each of said sun gears to one of said corresponding pinion gears; and means for selectively engaging a selected pinion gear with its corresponding rack gear to move a selected one of said trays between the rest position and the paper-feeding position.

9. The mechanism as set forth in claim 8, wherein said engaging means comprises:

a like plurality of levers being pivotally connected to said frame, each of said levers being disposed adjacent one of said respective pinion gears and being pivotally moveable between a blocking position and a non-blocking position, wherein, in the blocking position, each of said levers prevent engagement between said corresponding rack and pinion gears, and in the non-blocking position, each of said levers permit engagement between said corresponding rack and pinion gears.

10. The mechanism as set forth in claim 9, wherein said engaging means comprises:

a like plurality of cam members being pivotally connected to said frame, each of said cam members being adapted to contact one of said respective levers, wherein pivotal movement of one of said cam members pivotally moves the corresponding lever between the blocking position and the non-blocking position.

11. The mechanism as set forth in claim 10, further comprising:

means for moving a selected one of said levers from the blocking position to the non-blocking position.

12. The mechanism as set forth in claim 11, wherein said moving means comprises:

a paper feeding apparatus being controllably moveable along a preselected generally vertical path adjacent said trays.

13. The mechanism as set forth in claim 12, wherein said paper feeding apparatus is adapted to contact at least a selected one of said cam members as said paper feeding means moves vertically, the contact with said one selected cam member causing the corresponding lever to pivot from the blocking to the non-blocking position.

14. The mechanism as set forth in claim 13, wherein said paper feeding apparatus is adapted to contact the stack of paper in one of said trays when said one tray is in the paper-feeding position, and to remove one of said sheets of paper from the contacted stack.

15. The mechanism as set forth in claim 8, further comprising:

a like plurality of springs, each of said springs having a first end and a second end, the first end of each spring being connected to said frame and the second end of each spring being connected to one of said respective plurality of trays.

16. The mechanism as set forth in claim 15, wherein said springs bias said trays toward the rest position.

17. The mechanism as set forth in claim 15, wherein said springs comprise coiled leaf springs.

18. The mechanism as set forth in claim 15, further comprising:

a like plurality of feet, each foot being connected to one of said respective trays;

a like plurality of stirrups, each stirrup being connected to the second end of one of said respective springs, said stirrups being adapted to receive said respective feet when said trays are inserted into said frame.

19. A paper handling mechanism, comprising:

a plurality of paper receiving trays, each of said trays being adapted for receiving a stack of sheets of paper, said plurality of trays being generally vertically arranged relative to one another and being adapted for generally horizontal movement between a first position and a second position;

a first like plurality of gears, each gear being connected to one of said respective trays;

a second like plurality of gears being generally vertically arranged relative to one another, each of said second plurality of gears being disposed adjacent one of said respective first plurality of gears; and means for selectively driving one of said plurality of second gears in engagement with one of said first plurality of gears and moving one of said plurality of trays between the first and second positions.

20. A paper handling mechanism, comprising:

a frame;

a plurality of paper receiving trays, each of said trays being adapted for receiving a stack of sheets of paper, said plurality of trays being generally vertically arranged relative to one another with in said frame and being adapted for generally horizontal movement between a rest position and a paper-feeding position, each of said plurality of trays having a rack gear horizontally connected thereto;

a motor;

a shaft having a longitudinal axis and being generally vertically disposed on said frame adjacent said trays, said motor being operably connected to said shaft and being adapted to rotate said shaft about its longitudinal axis;

a like plurality of sun gears being connected to and rotatable with said shaft and being generally vertically arranged relative to one another along said shaft, each of said sun gears being disposed adjacent one of said corresponding rack gears;

a like plurality of pinion gears;

a like plurality of links counter-rotatably connecting each of said sun gears to one of said corresponding pinion gears;

a like plurality of levers being pivotally connected to said frame, each of said levers being disposed adjacent one of said respective pinion gears and being pivotally moveable between a blocking position and a non-blocking position, wherein, in the blocking position, each of said levers prevent engagement between said corresponding rack and pinion gears, and in the non-blocking position, each of said levers permit engagement between said corresponding rack and pinion gears;

a like plurality of cam members being pivotally connected to said frame, each of said cam members being adapted to contact one of said respective levers, wherein pivotal movement of one of said cam members pivotally moves the corresponding lever between the blocking position and the non-blocking position; and a paper feeding apparatus being controllably moveable along a preselected generally vertical path adjacent said trays, wherein said paper feeding apparatus is adapted to contact at least a selected one of said cam members as said paper feeding means moves vertically, the contact with said one selected cam member causing the corresponding lever to pivot from the blocking to the non-blocking position and thereby allowing the corresponding pinion gear to rotate into engagement with its corresponding rack gear and drive the corresponding tray from the rest position to the paper-feeding position.

* * * * *